(12) United States Patent
Shi

(10) Patent No.: US 12,483,483 B2
(45) Date of Patent: Nov. 25, 2025

(54) DATA PROCESSING METHOD AND APPARATUS

(71) Applicant: Huawei Technologies Co., Ltd., Guangdong (CN)

(72) Inventor: Jiutai Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 613 days.

(21) Appl. No.: 18/049,968

(22) Filed: Oct. 26, 2022

(65) Prior Publication Data

US 2023/0064755 A1 Mar. 2, 2023

Related U.S. Application Data

(63) Continuation of application No. PCT/CN2021/083871, filed on Mar. 30, 2021.

(30) Foreign Application Priority Data

Apr. 28, 2020 (CN) .......................... 202010351214.9

(51) Int. Cl.
*G06F 15/16* (2006.01)
*G06F 9/50* (2006.01)
(Continued)

(52) U.S. Cl.
CPC .......... *H04L 41/147* (2013.01); *G06F 9/5005* (2013.01); *G06F 11/3409* (2013.01); *G06N 20/00* (2019.01)

(58) Field of Classification Search
None
See application file for complete search history.

(56) References Cited

U.S. PATENT DOCUMENTS 11,080,336 B2 * 8/2021 Van Dusen ............ G06Q 50/01
2017/0091669 A1 * 3/2017 Kuromatsu ............ G06N 20/00
(Continued)

FOREIGN PATENT DOCUMENTS

CN 105162655 A 12/2015
CN 105991667 A 10/2016
(Continued)

OTHER PUBLICATIONS

Wang Yingxue et al., "Data Model Design and Processing Method for Cyberspace Expression", Journal of Geomatics Science and Technology, vol. 36 No. 6, 2019, with an English abstract, total 6 pages.

*Primary Examiner* — Phuoc H Nguyen
(74) *Attorney, Agent, or Firm* — WOMBLE BOND DICKINSON (US) LLP

(57) ABSTRACT

Embodiments of this application disclose a data processing method and apparatus, to improve network data processing performance. The data processing apparatus in the embodiments of this application is configured to process collected network data in a preset network environment. In the embodiments of this application, a method performed by the data processing apparatus includes: The data processing apparatus is configured to obtain first prediction information, and process the collected network data in the preset network environment, where the first prediction information includes a predicted value of a data amount to be processed in a first time period, and the first time period starts from a first moment; select a first data processing model from a data processing model set based on the first prediction information, where the data processing model set includes a second data processing model and the first data processing model; receive collected first network data when the first moment
(Continued)

arrives; and process the first network data in the first time period by using the first data processing model.

20 Claims, 6 Drawing Sheets

(51) Int. Cl.
   *G06F 11/34* (2006.01)
   *G06N 20/00* (2019.01)
   *H04L 41/147* (2022.01)

(56) References Cited

U.S. PATENT DOCUMENTS

| | | | |
|---|---|---|---|
| 2018/0060458 A1 | 3/2018 | Zhao et al. | |
| 2018/0060738 A1* | 3/2018 | Achin | G06N 20/00 |
| 2018/0060744 A1* | 3/2018 | Achin | G06N 20/00 |
| 2019/0339688 A1* | 11/2019 | Cella | H04L 1/18 |
| 2020/0134485 A1* | 4/2020 | Sood | G06N 5/01 |

FOREIGN PATENT DOCUMENTS

| | | |
|---|---|---|
| CN | 106549772 A | 3/2017 |
| CN | 107171848 A | 9/2017 |
| CN | 107451266 A | 12/2017 |
| CN | 108600038 A | 9/2018 |
| CN | 108737130 A | 11/2018 |
| CN | 109347606 A | 2/2019 |
| CN | 109586954 A | 4/2019 |
| CN | 109873712 A | 6/2019 |
| CN | 110059858 A | 7/2019 |
| CN | 110213784 A | 9/2019 |
| WO | 2016033973 A1 | 3/2016 |

* cited by examiner

DATA PROCESSING METHOD AND APPARATUS

CROSS-REFERENCE TO RELATED APPLICATIONS

This application is a continuation of International Application No. PCT/CN2021/083871, filed on Mar. 30, 2021, which claims priority to Chinese Patent Application No. 202010351214.9, filed on Apr. 28, 2020. The disclosures of the aforementioned applications are hereby incorporated by reference in their entireties.

TECHNICAL FIELD

This application relates to the field of communications technologies, further to an application of an artificial intelligence (AI) technology in the field of communications technologies, and in particular, to a data processing method and apparatus.

BACKGROUND

Data processing is a technical process that a data processing apparatus analyzes, processes, and converts data input into the data processing apparatus. The process includes processing of analyzing, consolidating, calculating, and editing input raw data. A purpose of the data processing is to extract and deduce information that is valuable and meaningful to particular people from a large amount of data that may be disordered and difficult to understand.

With fast development of Internet technologies, network data processing becomes a typical application scenario of the data processing. Network data includes but is not limited to traffic data generated by a large number of devices accessing the Internet and log data generated by a security protection device (such as a firewall and a security gateway). The data processing apparatus processes the network data to perform one or more functions, for example, service awareness, traffic classification, and application identification.

A working principle of a currently widely applied network data processing solution is as follows: A data processing apparatus receives network data collected from a network environment; and the data processing apparatus processes received network data by using a data processing model and outputs a processing result. The data processing model is obtained by training based on a machine learning method. If the data processing apparatus is used as a computing device that can respectively work, sold, and manufactured, a processing resource of the data processing apparatus is referred to as an internal resource. In addition to the internal resource, the data processing apparatus further has a resource borrowed from an external connection. For example, the borrowed resource may be a memory or a processor that may be borrowed. When the internal resource of the data processing apparatus is insufficient, the data processing apparatus can apply for and obtain all or some borrowed resources, and process the received network data by using the internal resource and the borrowed resource, to meet a throughput.

However, for a scenario that no borrowed resource is set for the data processing apparatus, or a borrowed resource is insufficient for to-be-processed network data, there is no solution that can meet a throughput in the prior art.

SUMMARY

Embodiments of this application provide a data processing method and apparatus, to improve network data processing performance.

According to a first aspect, an embodiment of this application provides a data processing method. The method is performed by a data processing apparatus, and the data processing apparatus is configured to process collected network data in a preset network environment. The method may include the following operations. The data processing apparatus obtains first prediction information. The first prediction information includes a predicted value of a data amount to be processed in a first time period, and the first time period starts from a first moment. The data processing apparatus selects a first data processing model from a data processing model set based on the first prediction information. The data processing model set includes a second data processing model and the first data processing model. Accuracy of the first data processing model is higher than that of the second data processing model, and a throughput of the first data processing model is lower than that of the second data processing model. Alternatively, accuracy of the first data processing model is lower than that of the second data processing model, and a throughput of the first data processing model is higher than that of the second data processing model. The data processing apparatus receives collected first network data when the first moment arrives. The data processing apparatus processes the first network data in the first time period by using the first data processing model.

Although the data amount received by the data processing apparatus in different time periods is not fixed, in this embodiment of this application, the data processing apparatus may obtain the predicted value of the data amount to be processed in the first time period. The data processing apparatus may select an optimal data processing model for processing the first network data from the data processing model set based on the predicted value. In this way, the data processing apparatus may process the first network data in the first time period by using the first data processing model. This can improve performance of processing the first network data.

In an embodiment of the first aspect, the data processing apparatus may select the first data processing model in the following manner. The data processing apparatus determines first resource usage of the first data processing model based on the first prediction information, and by analogy, determines first resource usage of each data processing model in the data processing model set. The first resource usage of the first data processing model is a predicted value of a first quantity of resources used when the data processing apparatus executes a first process by using the first data processing model. The first process is a process of processing the data amount to be processed in the first time period. The data processing apparatus may select the first data processing model from the data processing model set based on a quantity of available resources and the first resource usage of each data processing model in the data processing model set. The quantity of available resources is a first quantity of available resources in the first time period.

The first resource usage of the data processing model may reflect the throughput and the accuracy of the data processing model. In this embodiment, the data processing apparatus may select the first data processing model from the data processing model set based on the quantity of available resources and the first resource usage of each data processing model in the data processing model set.

In an embodiment of the first aspect, the data processing apparatus determines the first resource usage of the first data processing model in the following manner. The data processing apparatus inputs the first prediction information into a prediction model to obtain the first resource usage of the first data processing model. The prediction model is used to predict a first quantity of resources used when the data processing apparatus executes a single process by using the first data processing model. The single process is a process of processing a data amount to be processed in one time period. The prediction model is obtained by training based on a historical sample set. The historical sample set includes a first sample. The first sample includes an actual value of a data amount to be processed in a second time period. A label of the first sample is an actual value of a first quantity of resources used when the data processing apparatus executes a second process based on the first data processing model. The second process is a process of processing the data amount to be processed in the second time period, and the second time period is earlier than the first time period.

In this possible implementation, the data processing apparatus may determine the first resource usage of the first data processing model by training based on a machine learning method. This can improve accuracy of the first resource usage, select the optimal data processing model, and improve the performance of processing the first network data.

In an embodiment of the first aspect, after the data processing apparatus processes the first network data in the first time period by using the first data processing model, the data processing apparatus further performs the following method. The data processing apparatus obtains first actual information and second resource usage. The first actual information includes an actual value of a processed data amount in the first time period. The second resource usage is an actual value of the first quantity of resources used when the data processing apparatus executes the first process by using the first data processing model. The data processing apparatus trains the prediction model based on the first actual information and the second resource usage.

In this possible implementation, the data processing apparatus may continuously add or update the historical sample set of the prediction model, to improve a prediction effect of the prediction model, so that a prediction result of the prediction model is further close to an actual result. The data processing apparatus may select the first data processing model from the data processing model set based on the quantity of available resources and the prediction result of the prediction model. This can select the optimal data processing model, and improve the performance of processing the first network data.

In an embodiment of the first aspect, the data processing apparatus determines the first resource usage of the first data processing model in the following manner. The data processing apparatus determines the first resource usage of the first data processing model based on the first prediction information, second actual information, a third resource usage, a performance parameter of the first data processing model, and a performance parameter of a used data processing model. The used data processing model is the first data processing model, or the used data processing model is the second data processing model, or the used data processing model is one data processing model other than the first data processing model and the second data processing model in the data processing model set. The second actual information includes an actual value of a processed data amount in a third time period. The third resource usage is an actual value of a first quantity of resources used when the data processing apparatus executes a third process by using the used data processing model. The third process is a process of processing a data amount to be processed in the third time period. The third time period is earlier than the first time period. The performance parameter of the first data processing model indicates the accuracy of the first data processing model. The performance parameter of the first data processing model is different from that of the second data processing model.

This possible implementation provides a method independent of the prediction model. The data processing apparatus may save a resource required by training the prediction model. In addition, the data processing apparatus may predict a first quantity of resources used by the first data processing model in more time periods. The data processing apparatus may perform the method in this embodiment of this application in more time periods, to maintain high performance in a network data processing process.

In an embodiment of the first aspect, the data processing apparatus processes the first network data in the first time period by using the first data processing model in the following manner. The data processing apparatus extracts a feature value of each feature in a first feature set from the first network data in the first time period according to a feature extraction rule of the first data processing model. A quantity of features in a second feature set is different from that of features in the first feature set. The first feature set and the second feature set respectively correspond to the first data processing model and the second data processing model. The data processing apparatus inputs the feature value extracted from the first network data into the first data processing model in the first time period, to process the first network data by using the first data processing model.

In this possible implementation, the data processing apparatus may extract the feature value according to a feature extraction rule of a data processing model and a feature in a feature set. In this way, the data processing model set may include data processing models having different feature extraction rules and feature sets. This can add more data processing models to the data processing model set, and select an optimal data processing model for processing the first network data.

In an embodiment of the first aspect, the performance parameter of the first data processing model is the quantity of features in the first feature set.

The following uses the first data processing model and the second data processing model as an example. If the quantity of features in the first feature set is greater than that of features in the second feature set, the accuracy of the first data processing model is higher than that of the second data processing model, and the throughput of the first data processing model is less than that of the second data processing model. On the contrary, if the quantity of features in the first feature set is less than that of features in the second feature set, the accuracy of the first data processing model is lower than that of the second data processing model, and the throughput of the first data processing model is higher than that of the second data processing model. In this possible implementation, the quantity of features in the feature set corresponding to the data processing model is used as the performance parameter of the data processing model, so that the performance parameter may reflect the throughput and the accuracy of the data processing model. A basis for determining the first resource usage of the first data processing model by the data processing apparatus includes the performance parameter of the first data processing model and the performance parameter of the used data processing model. This can improve the accuracy of the first resource usage of the first data processing model.

A first difference is a difference between the first resource usage and the quantity of available resources of the first data processing model, and a second difference is a difference between the first resource usage and the quantity of available resources of the second data processing model. In an embodiment of the first aspect, the first difference is less than the second difference.

In this possible implementation, the first difference is less than the second difference, so that the data processing apparatus improves accuracy of processing the first network data when meeting a completion rate requirement.

In an embodiment of the first aspect, the first quantity of resources is a time length consumed when the data processing apparatus processes the received network data.

The time length of using the data processing model to process the network data by the data processing apparatus may reflect the throughput and the accuracy of the data processing model. In this possible implementation, the data processing apparatus may select the optimal data processing model based on the quantity of available resources, and a throughput and accuracy of each data processing model, thereby improving performance of processing network data by using the selected data processing model.

In an embodiment of the first aspect, the preset network environment includes a network data sending apparatus and the data processing apparatus. The sending apparatus includes one or more data source devices. The collected network data includes network data generated by the one or more data source devices. Alternatively, the sending apparatus is a packet forwarding device with a data collection function. The collected network data includes network data collected by the packet forwarding device. The data processing apparatus is a computer, a computer cluster, or a computer in the computer cluster. The computer cluster is configured to process the collected network data in a load balancing manner.

This possible implementation provides a plurality of preset network environments. This can expand an application scope of the data processing method in this application.

In an embodiment of the first aspect, the first prediction information further includes a predicted value of a second quantity of available resources in the first time period.

The throughput of the data processing model is related to the quantity of available resources (referred to as a second quantity of resources) of the data processing apparatus. In this possible implementation, the predicted value of the second quantity of available resources is added to the first prediction information in the first time period, so that the data processing apparatus may select the optimal data processing model.

In an embodiment of the first aspect, a second quantity of resources includes at least one of a quantity of hardware resources and a quantity of network resources.

The quantity of hardware resources and the quantity of network resources are easy to measure and predict. In this possible implementation, the second quantity of available resources includes at least one of the quantity of hardware resources and the quantity of network resources. This can improve accuracy of the first prediction information, and further help the data processing apparatus select the optimal data processing model.

According to a second aspect, an embodiment of this application provides a data processing apparatus. The data processing apparatus includes a network interface, a memory, and a processor connected to the memory. The memory is configured to store instructions. The processor is configured to execute the instructions, so that the data processing apparatus performs the method in any one of the first aspect or the possible implementations of the first aspect. For details, refer to the foregoing detailed descriptions. Details are not described herein again.

According to a third aspect, an embodiment of this application provides a processing apparatus. The processing apparatus has functions of implementing the method according to any one of the first aspect or the possible implementations of the first aspect. The functions may be implemented by hardware, or may be implemented by executing corresponding software by hardware. The hardware or the software includes one or more modules corresponding to the foregoing functions.

According to a fourth aspect, an embodiment of this application provides a computer storage medium. The computer storage medium is configured to store computer software instructions used by a data processing apparatus, and include a program designed to perform any one of the first aspect or the possible implementations of the first aspect.

According to a fifth aspect, another aspect of this application provides a computer program product including instructions. When the computer program product is run on a computer, the computer is enabled to perform the method according to the foregoing aspects.

According to a sixth aspect, an embodiment of this application provides a chip. The chip includes a memory and a processor. The memory is configured to store computer instructions. The processor is configured to call the computer instructions from the memory and run the computer instructions, to perform the method according to any one of the first aspect and the possible implementations of the first aspect.

According to a seventh aspect, an embodiment of this application further provides a data processing system. The data processing system includes a network data sending apparatus and the data processing apparatus according to any one of the second aspect and the possible implementations of the second aspect. The sending apparatus includes one or more data source devices. Collected network data includes network data generated by the one or more data source devices. Alternatively, the sending apparatus is a packet forwarding device with a data collection function. The collected network data includes network data collected by the packet forwarding device. The data processing apparatus is a computer, a computer cluster, or a computer in the computer cluster. The computer cluster is configured to process the collected network data in a load balancing manner.

For technical effects brought by any one of the second aspect, the third aspect, the fourth aspect, the fifth aspect, the sixth aspect, and the seventh aspect, or the possible implementations thereof, refer to technical effects brought by the first aspect or the different possible implementations of the first aspect. Details are not described herein again.

BRIEF DESCRIPTION OF DRAWINGS

To more clearly describe technical solutions in embodiments of this application, the following briefly describes accompanying drawings used in embodiments. It is clearly that the accompanying drawings in the following descriptions are merely some embodiments of this application. A person of ordinary skill in the art may still derive other drawings from these accompanying drawings without creative efforts.

DESCRIPTION OF EMBODIMENTS

Figure 1A:
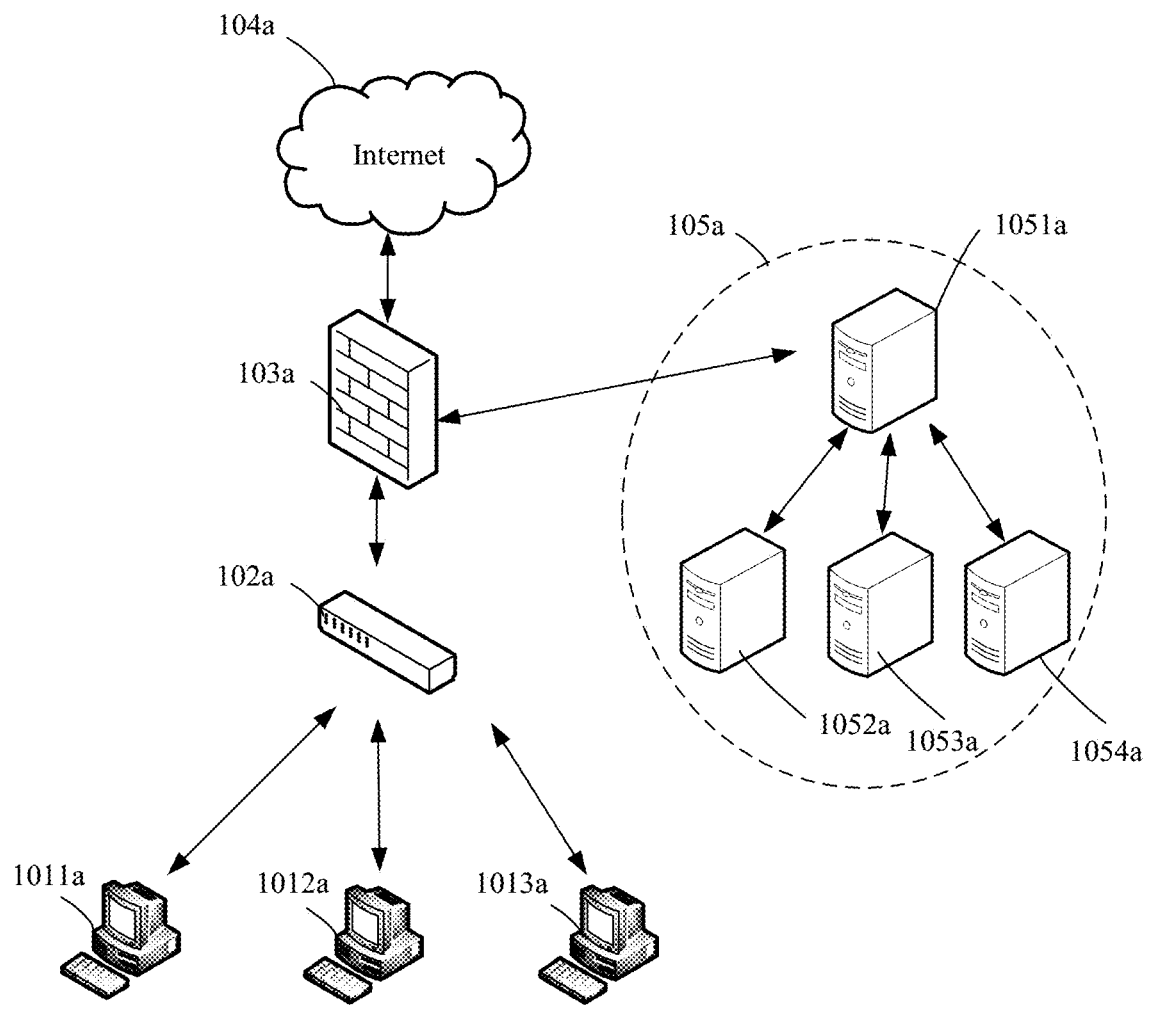
FIG. 1A is a schematic diagram of a network environment according to an embodiment of this application.

In a single time period, a data processing apparatus receives network data collected from a network environment, processes the network data by using a data processing model, and outputs a processing result. Generally, performance of processing the network data by the data processing apparatus is evaluated based on accuracy and a completion rate of processing the network data by the data processing apparatus. The completion rate is a percentage of an actually processed data amount to a data amount to be processed. The accuracy refers to a percentage of a correctly processed data amount to the actually processed data amount.

Upon analysis, it can be concluded as follows: The accuracy of processing the network data by the data processing apparatus is determined based on accuracy of the data processing model used when the data processing apparatus processes the network data. The completion rate of processing the network data by the data processing apparatus is determined based on a throughput of the data processing model and a data amount corresponding to the network data. The throughput is a maximum data amount to be processed in the single time period.

Based on the foregoing conclusion, embodiments of this application provide a data processing method and apparatus, to improve the performance of processing the network data by the data processing apparatus. The following briefly describes embodiments of this application.

At least two data processing models are preset in a data processing apparatus, and the at least two data processing models differ in accuracy and a throughput. The data processing apparatus predicts a data amount in a future time period, and selects a data processing model from the at least two data processing models based on the data amount. The data processing apparatus receives network data within the time period, and processes the received network data by using the selected data processing model, to perform one or more functions, for example, service awareness, traffic classification, and application identification.

The following describes embodiments of this application in detail with reference to the accompanying drawings. A person of ordinary skill in the art may learn that, with technology development and emergence of a new scenario, the technical solutions provided in embodiments of this application are also applicable to a similar technical problem.

In the specification, claims, and accompanying drawings of this application, terms "first", "second", and the like are intended to distinguish between similar objects but do not necessarily indicate a specific order or sequence. It should be understood that the data used in such a way are interchangeable in appropriate circumstances, so that embodiments described herein can be implemented in other orders than the content illustrated or described herein.

In embodiments of this application, the network data received by the data processing apparatus comes from a preset network environment. To facilitate understanding of an application scenario of this application, the following first describes an application background of embodiments of this application by using two specific network environments as an example. It should be noted that the data processing method provided in embodiments of this application is also applicable to another possible network environment. The network listed in embodiments of this application includes the data processing apparatus and a network data sending apparatus. The network environment to which the data processing method provided in embodiments of this application is applied includes but is not limited to the following scenario 1 and scenario 2.

Scenario 1

The data processing apparatus is a general-purpose computer device. In an embodiment, the computer device may be a server, one or more virtual machines, a computer cluster, or a computer in the computer cluster. When the computer device is the computer cluster, the computer cluster is configured to process the received network data in a load balancing manner.

FIG. 1A is a schematic diagram of a preset network environment according to this application. Refer to FIG. 1A. The data processing apparatus in the preset network environment is used as the computer device (or the computer cluster, or one computer in the computer cluster), and the sending apparatus is a packet forwarding device. The packet forwarding device has a data collection function. The packet forwarding device is, for example, a firewall, a router, or a security gateway. The packet forwarding device is connected to a packet transmission path between user equipment and an Internet server in an in-line manner, and sends network data passing through the packet forwarding device to the data processing apparatus. For example, the packet forwarding device caches the network data passing through the packet forwarding device, and sends the cached data to the data processing apparatus. Alternatively, for example, the packet forwarding device sends the network data passing through the packet forwarding device to the data processing apparatus in a port mirroring manner. FIG. 1A uses an example in which the data processing apparatus is the computer, the computer cluster, or the computer in the computer cluster. Alternatively, the data processing apparatus is an independent computer device.

Refer to FIG. 1A. The preset network environment includes user equipment 1011a, user equipment 1012a, user equipment 1013a, a switch 102a, a firewall 103a, the Internet 104a, and a computer cluster 105a that are connected in a wired or wireless manner. FIG. 1A uses an example in which the preset network environment includes the user equipment 1011a, the user equipment 1012a, and the user equipment 1013a. In an embodiment, in an actual application, the preset network environment includes more or fewer user equipments. The user equipment 1011a, the user equipment 1012a, and the user equipment 1013a are separately connected to the switch 102a. The switch 102a is configured to support network data interaction between the user equipment 1011*a*, the user equipment 1012*a*, and the user equipment 1013*a* and the Internet 104*a*. The firewall 103*a* is disposed between the switch 102*a* and the Internet 104*a*, to ensure network data security. A data collection module (not shown in FIG. 1A) disposed in the firewall 103*a* is configured to collect network data passing the firewall 103*a*, and send the collected network data to the computer cluster 105*a*. FIG. 1A uses an example in which the computer cluster 105*a* includes a server 1051*a*, a server 1052*a*, a server 1053*a*, and a server 1054*a*. In an embodiment, the computer cluster 105*a* includes more or fewer servers in an actual application. In an embodiment, the server 1051*a* is a load balancing server, so that the server 1052*a*, a server 1053*a*, and a server 1054*a* process the received network data in a load balancing manner.

Scenario 2

The data processing apparatus is a cloud server. In an embodiment, the cloud server is a general-purpose computer device. In an embodiment, the computer device may be a server, one or more virtual machines, a computer cluster, or a computer in the computer cluster. When the computer device is the computer cluster, the computer cluster is configured to process collected network data in a load balancing manner.

Figure 1B:
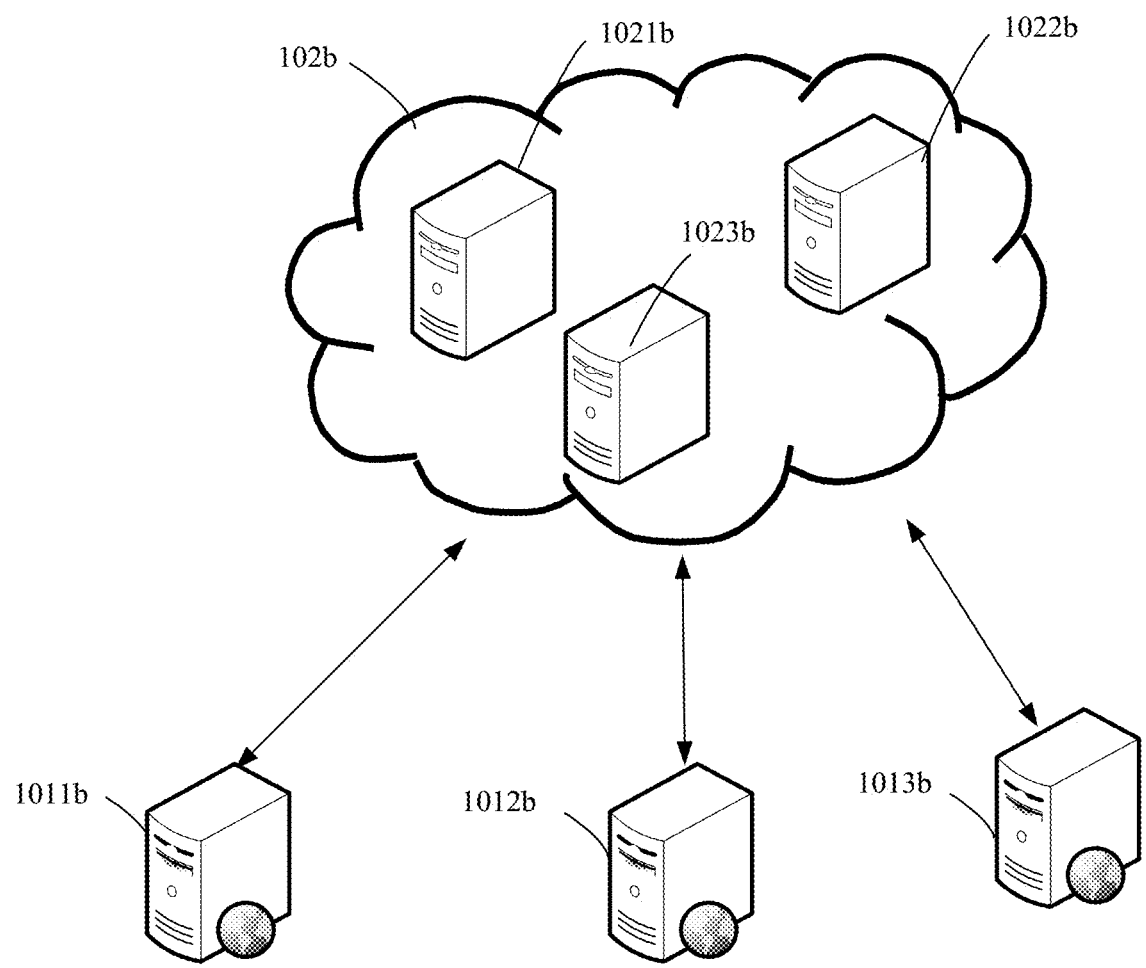
FIG. 1B is a schematic diagram of another network environment according to an embodiment of this application.

FIG. 1B is another schematic diagram of a preset network environment according to this application. FIG. 1B uses an example in which the data processing apparatus in the preset network environment is a cloud server, and the sending apparatus is a data source device or a packet forwarding device having a data collection function. The cloud server provides a network data processing service for an Internet user. The data source device is configured to generate network data. The data source device is, for example, a website server. The data source device sends the generated network data to the cloud server, to request the cloud server to process the network data. FIG. 1B uses an example in which the data processing apparatus is the cloud server.

Refer to FIG. 1B. The preset network environment includes a website server 1011*b*, a website server 1012*b*, a website server 1013*b*, and a cloud server 102*b*. FIG. 1B uses an example in which the preset network environment includes three website servers. In an embodiment, in an actual application, the preset network environment includes more or fewer website servers. The website server 1011*b*, the website server 1012*b*, and the website server 1013*b* are separately connected to the cloud server 102*b*. The website server 1011*b*, the website server 1012*b*, and the website server 1013*b* are configured to generate network data, and send the generated network data to the cloud server 102*b* through a website user interface (Web UI), to request the cloud server 102*b* to provide a service. The cloud server 102*b* processes the received network data, and feeds back a processing result, through the Web UI, an email, or the like, to a website server submitting the network data, to provide a service to the website server 1011*b*, the website server 1012*b*, and the website server 1013*b*. FIG. 1B uses an example in which the cloud server 102*b* includes a virtual machine 1021*b*, a virtual machine 1022*b*, and a virtual machine 1023*b*. In an embodiment, the cloud server 102*b* includes more or fewer virtual machines in an actual application.

FIG. 1A and FIG. 1B describe examples of the network environments to which the data processing method provided in embodiments of this application is applicable. The following describes a structure of a data processing apparatus provided in embodiments of this application.

Figure 2A:
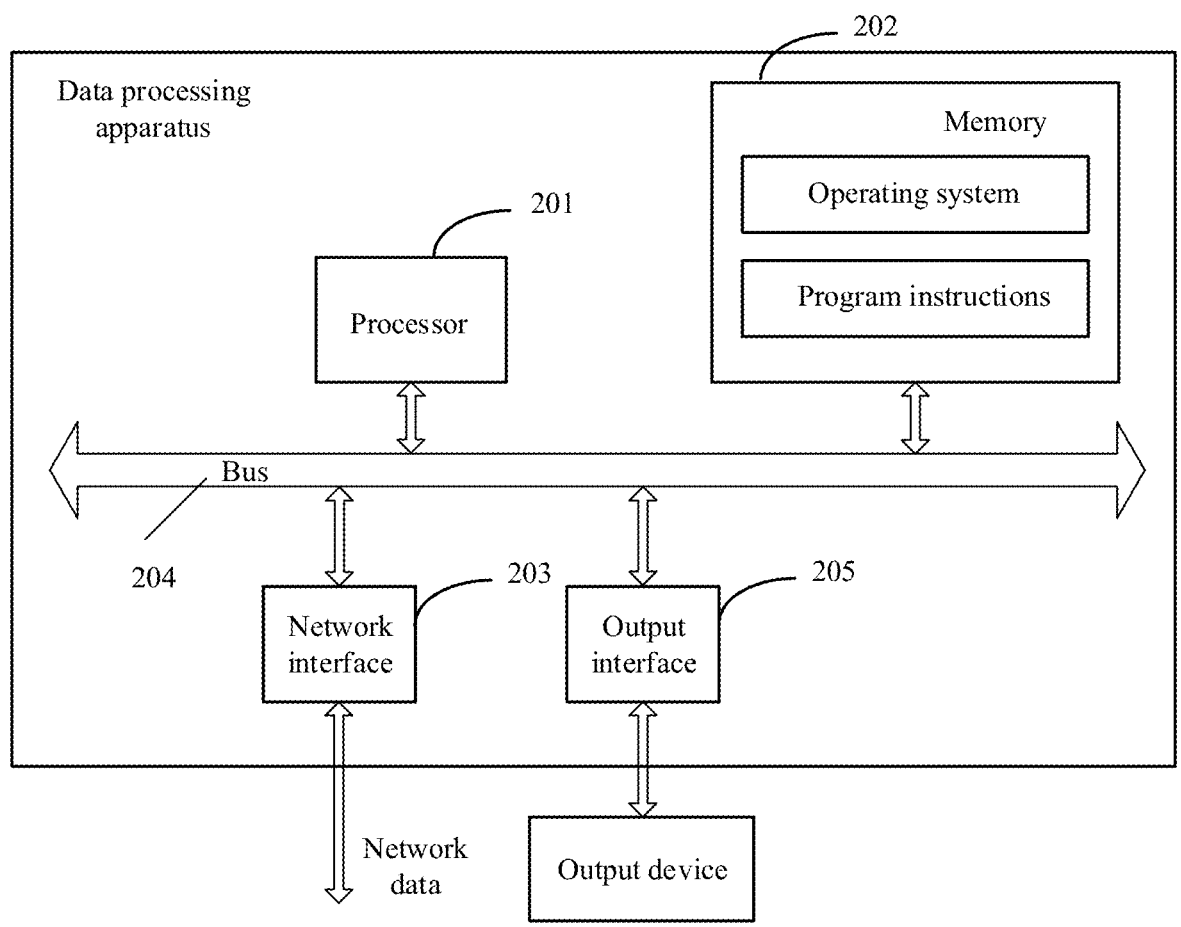
FIG. 2A is a schematic diagram of a structure of a data processing apparatus according to an embodiment of this application.

FIG. 2A is a schematic diagram of a structure of a data processing apparatus according to an embodiment of this application. Refer to FIG. 2A. The data processing apparatus includes a processor 201, a memory 202, and a network interface 203.

The processor 201 may be one or more CPUs, and the CPU may be a single-core CPU, or may be a multi-core CPU.

The memory 202 includes but is not limited to a random access memory (RAM), a read-only memory (ROM), an erasable programmable read-only memory (EPROM), a flash memory, an optical memory, or the like. The memory 202 stores code of an operating system and program instructions.

The network interface 203 may be a wired interface, for example, a fiber distributed data interface (FDDI) or a gigabit Ethernet (GE) interface. Alternatively, the network interface 203 may be a wireless interface. The network interface 203 is configured to receive network data from an internal network and/or an external network.

In an embodiment, the data processing apparatus further includes a bus 204. The processor 201 and the memory 202 are usually connected to each other by using the bus 204, or may be connected to each other in another manner.

In an embodiment, the data processing apparatus further includes an output interface 205. The output interface 205 is connected to an output device, and is configured to output a processing result of the network data to a user by using the output device. The output device includes but is not limited to a display, a printer, or the like.

In an embodiment, the processor 201 implements the data processing method in this embodiment of this application by reading the program instructions stored in the memory 202, or the processor 201 may implement the data processing method in this embodiment of this application by using internally stored program instructions.

If the processor 201 implements the data processing method in this embodiment of this application by reading the program instructions stored in the memory 202, the memory 202 stores program instructions for implementing the data processing method in this embodiment of this application. After reading the program instructions stored in the memory 202, the processor 201 generates one or more software functional modules. The division of software functional modules is merely logical function division. For ease of understanding, the following provides a possible division manner of the software functional modules.

Figure 2B:
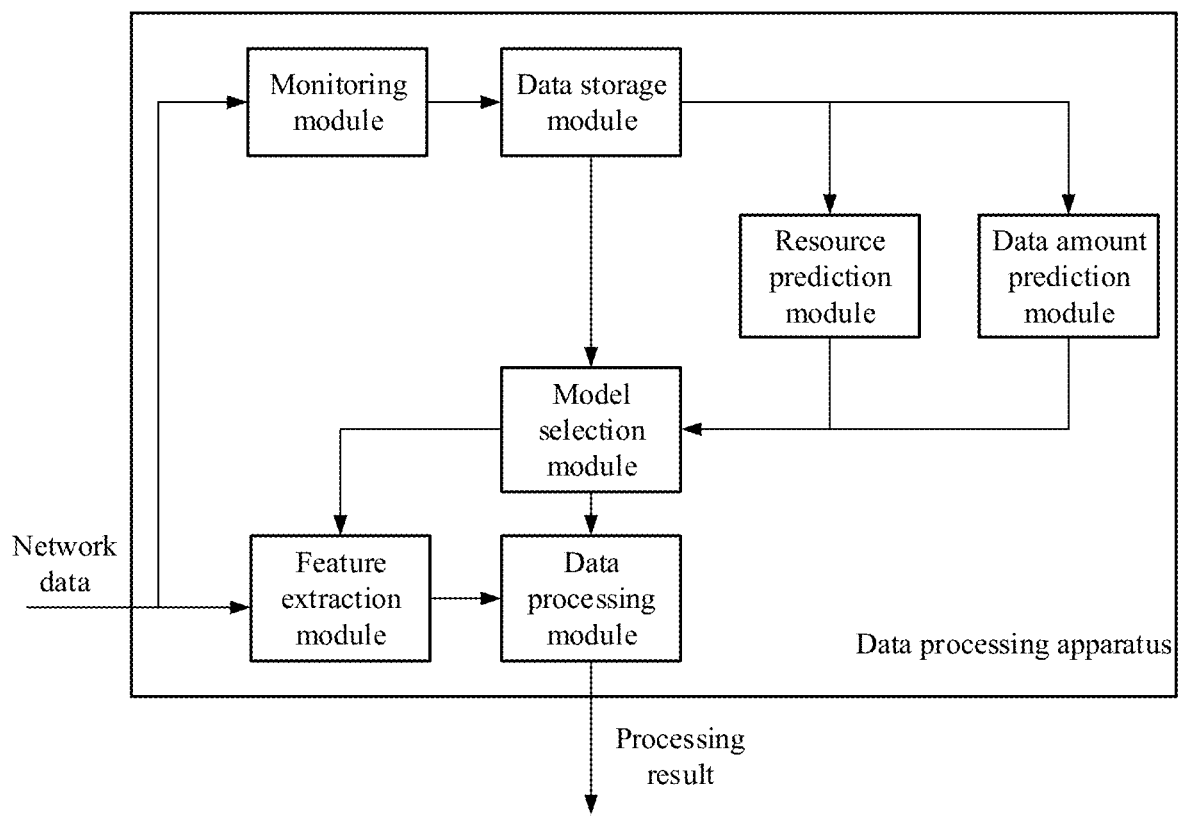
FIG. 2B is a functional block diagram of a data processing apparatus according to an embodiment of this application.

FIG. 2B is a functional block diagram of a data processing apparatus according to an embodiment of this application. FIG. 2B shows modules in the data processing apparatus that are generated after the processor 201 reads the program instructions stored in the memory 202 in FIG. 2A. Refer to FIG. 2B. The data processing apparatus in this application includes a monitoring module, a data storage module, a data amount prediction module, a resource prediction module, a model selection module, a feature extraction module, and a data processing module.

The monitoring module is configured to monitor a data amount processed by the data processing apparatus and a quantity of resources used by the data processing apparatus in each time period. The processed data amount refers to a size of network data processed by the data processing apparatus. Resource usage includes CPU usage, memory usage, disk usage, and network bandwidth usage.

The data storage module is configured to store the processed data amount and the resource usage that are monitored by the monitoring module. In this embodiment of this application, a data amount processed in a plurality of past time periods and stored in the data storage module are referred to as a historical data amount. A quantity of resources used in the plurality of past time periods and stored in the data processing module are referred to as a quantity of historical resources.

The data amount prediction module is configured to obtain the historical data amount from the data storage module, and predict a data amount to be processed in a future time period (referred to as an X time period) by the data processing apparatus based on the historical data amount. In an embodiment, the X time period is a next time period of a current time period. In an embodiment, the data amount prediction module uses a machine learning method to predict the data amount to be processed in the X time period by the data processing apparatus.

The resource prediction module is configured to obtain the quantity of historical resources from the data storage module, and predict a quantity of available resources used by the data processing apparatus in the X time period based on the quantity of historical resources. The data amount prediction module uses the machine learning method to predict the quantity of available resources used by the data processing apparatus in the X time period.

The model selection module is configured to obtain the quantity of available resources predicted by the resource prediction module in the X time period and the data amount to be processed in the X time period and predicted by the data amount prediction module. The model selection module is further configured to select a data processing model from a data processing model set based on the obtained data, and send a selection result to the feature extraction module and the data processing module. In an embodiment, each data processing model in the data processing model set corresponds to an identifier. The selection result includes an identifier corresponding to the selected data processing model in the X time period. Different data processing models in the data processing model set correspond to different identifiers.

The feature extraction module is configured to determine, based on the selection result sent by the model selection module, a feature extraction rule corresponding to the selected data processing model in the X time period. The feature extraction module is further configured to extract a feature of network data received in the X time period according to the feature extraction rule. In an embodiment, the feature extraction module is configured to set a feature extraction rule of each data processing model in the data processing model set.

The data processing module is configured to determine the data processing model in the X time period based on the selection result sent by the selected model selection module. The data processing module is further configured to process, by using the data processing model, the feature extracted by the feature extraction module. The data processing module sets the data processing model set, where the data processing model set includes at least two data processing models. Each data processing model in the data processing model set is obtained based on the machine learning method.

The data processing apparatus described in FIG. 2B is merely an example, and does not limit the division of functions or modules of the data processing apparatus in this embodiment of this application. In an embodiment, compared with the data processing apparatus in FIG. 2B, the data processing apparatus in this embodiment of this application includes more or fewer modules. For example, the data processing apparatus excludes the data storage module, the resource prediction module, and the data amount prediction module. The data processing apparatus invokes a data storage module, a resource prediction module, and a data amount prediction module from another external device through an external interface.

Figure 3:
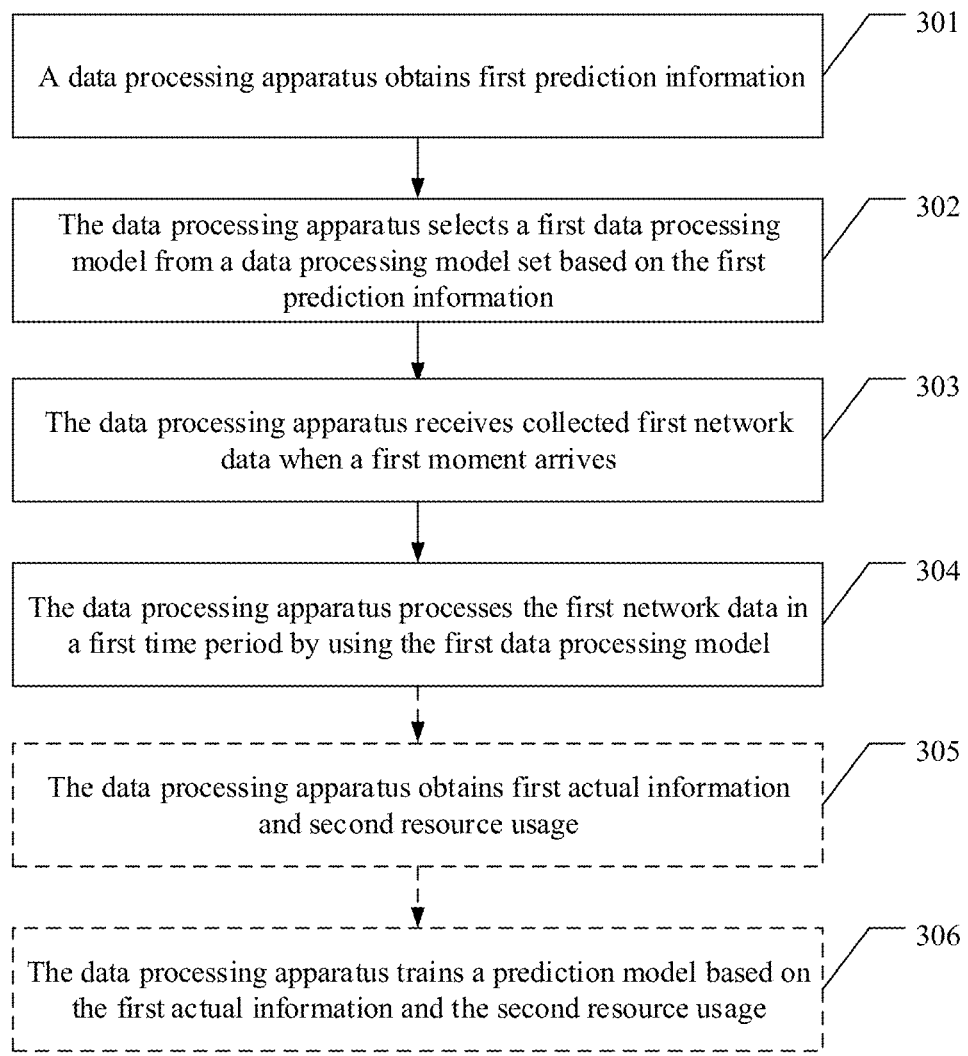
FIG. 3 is a flowchart of principles of a data processing method according to an embodiment of this application.

FIG. 2A and FIG. 2B describe an example of a structure of the data processing apparatus in this embodiment of this application. The following describes a data processing method performed by the data processing apparatus according to this embodiment of this application. FIG. 3 is a flowchart of principles of a data processing method according to an embodiment of this application. Refer to FIG. 3. The data processing method in this application includes operations 301 to 304. In an embodiment, the data processing method in FIG. 3 is performed by the data processing apparatus, for example, the computer cluster 105a or the computer in the computer cluster 105a in FIG. 1A, or the cloud server 102b in FIG. 1B, or performed by the data processing apparatus having a structure shown in FIG. 2A or FIG. 2B.

301: The data processing apparatus obtains first prediction information.

In this embodiment of this application, the data processing apparatus is configured to process collected network data in a preset network environment. In an embodiment, the preset network environment is that shown in FIG. 1A or FIG. 1B.

In this embodiment of this application, the first prediction information includes a predicted value of a data amount to be processed in a time period. For ease of description, the time period is referred to as a first time period, and a start moment of the first time period is referred to as a first moment.

In an embodiment, the data amount to be processed in the first time period is that obtained by the data amount prediction module in FIG. 2B.

302: The data processing apparatus selects a first data processing model from a data processing model set based on the first prediction information.

In this embodiment of this application, the data processing model set is preset in the data processing apparatus, where the data processing model set includes at least two data processing models. After obtaining the first prediction information, the data processing apparatus selects one data processing model from the data processing model set based on the first prediction information. For ease of description, the data processing model selected by the data processing apparatus is referred to as a first data processing model.

The data processing model set includes the first data processing model and a second data processing model. Accuracy of the first data processing model is higher than that of the second data processing model, and a throughput of the first data processing model is lower than that of the second data processing model. Alternatively, accuracy of the first data processing model is lower than that of the second data processing model, and a throughput of the first data processing model is higher than that of the second data processing model. It should be noted that a quantity of data processing models included in the data processing model set may alternatively be an integer greater than 2. For brevity of description, this embodiment uses an example in which the data processing model set includes two data processing models. When the quantity of data processing models included in the data processing model set is greater than 2, the data processing models also have similar accuracy and throughput. In other words, a data processing model with high accuracy usually has a low throughput, and a data processing model with low accuracy usually has a high throughput.

Refer to FIG. 2B. In an embodiment, the data processing apparatus performs operation 302 by using a model selection module. It should be noted that in this embodiment of this application, operation 302 is performed when the first moment arrives.

303: The data processing apparatus receives collected first network data when the first moment arrives.

In this embodiment of this application, the data processing apparatus is configured to process the collected network data in the preset network environment when the first moment arrives. For ease of description, the network data is referred to as the first network data.

Refer to related descriptions of FIG. 1A and FIG. 1B. In an embodiment, the first network data comes from a packet forwarding device or a data source device.

304: The data processing apparatus processes the first network data in the first time period by using the first data processing model.

In an embodiment, the first network data refers to all network data received by the data processing apparatus in the first time period. The data processing apparatus caches the network data received in the first time period, and centrally processes the first network data.

In an embodiment, the first network data refers to a portion of network data received by the data processing apparatus in the first time period. Optionally, the first network data refers to network data received in specific duration in the first time period, or the first network data refers to a specific size of network data received in the first time period. After receiving the first network data in the first time period, the data processing apparatus processes the first network data.

In this embodiment of this application, the data processing model set is preset in the data processing apparatus, where the data processing model set includes at least two data processing models. The accuracy of the first data processing model is higher than that of the second data processing model, and the throughput of the first data processing model is lower than that of the second data processing model. Alternatively, the accuracy of the first data processing model is lower than that of the second data processing model, and the throughput of the first data processing model is higher than that of the second data processing model. Although the data amount received by the data processing apparatus in different time periods is not fixed, the data processing apparatus may obtain the predicted value of the data amount to be processed in the first time period. The data processing apparatus may select, based on the predicted value, an optimal data processing model for processing the first network data from the data processing model set. It is assumed that the data processing model selected by the data processing apparatus is referred to as the first data processing model. The data processing apparatus may process the first network data in the first time period by using the first data processing model. This can improve the performance of processing the first network data.

The data processing apparatus includes a plurality of performance indicators for evaluating performance. In different application scenarios, a person skilled in the art usually uses different performance indicators to measure the performance of the data processing apparatus. The performance indicators include, for example, a completion rate and accuracy. In the following example, an application scenario that uses the completion rate and the accuracy to measure the performance of the data processing apparatus is used to describe a method for selecting an optimal data processing model from a data processing model set by the data processing apparatus in this embodiment of this application.

It is assumed that the data processing model set includes a model 1 and a model 2. A throughput and accuracy of the model 1 are v1 and a1 respectively. A throughput and accuracy of the model 2 are v2 and a2 respectively. In addition, v1<v2, and a1>a2. V represents the predicted value of the data amount to be processed by the data processing apparatus in the first time period, and network data 1 represents network data whose data amount is V. A completion rate 1 and accuracy 1 respectively represent a completion rate and accuracy of processing the network data 1 by the data processing apparatus by using the model 1. A completion rate 2 and accuracy 2 respectively represent a completion rate and accuracy of processing the network data 1 by the data processing apparatus by using the model 2.

If V<v1, both the completion rate 1 and the completion rate 2 are 1. In this case, if a1>a2, the accuracy 1>the accuracy 2, and model 1 is better than model 2. In an embodiment with reference to the data processing method corresponding to FIG. 3, the first data processing model is the model 1, and the second data processing model is the model 2.

If V>v1, the completion rate of using the model 1 by the data processing apparatus is less than 1. If v1<v2, the completion rate 2>the completion rate 1. In this case, the model 2 is better than model 1. In an embodiment, with reference to the data processing method corresponding to FIG. 3, the first data processing model is the model 2, and the second data processing model is the model 1.

In this embodiment of this application, the first time period may be one of a plurality of time periods. The data processing apparatus may perform the method in this embodiment of this application for the plurality of time periods based on similar principles. The following briefly describes a process of performing the method in this embodiment of this application on network data by the data processing apparatus in the plurality of time periods by using an example in which the plurality of time periods include non-overlapping time periods 1 and 2.

The data processing apparatus selects a data processing model from a data processing model set based on a predicted value of a data amount to be processed in the time period 1, and processes network data received in the time period 1 by using the selected data processing model in the time period 1. The data processing apparatus selects a data processing model from a data processing model set based on a predicted value of a data amount to be processed in the time period 2, and processes network data received in the time period 2 by using the selected data processing model in the time period 2. The data processing apparatus may perform the method in this embodiment of this application for the plurality of time periods. This can maintain high performance in a network data processing process.

Figure 4:
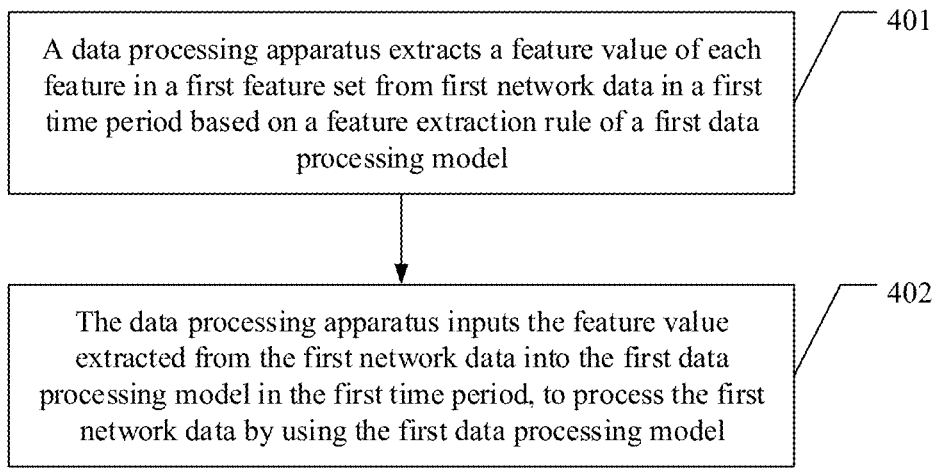
FIG. 4 is a schematic diagram of another embodiment of a data processing method according to an embodiment of this application.

Refer to FIG. 3. The data processing apparatus processes the first network data in the first time period by using the first data processing model in the operation 304. Refer to FIG. 4. In an embodiment, the operation 304 includes operations 401 and 402. The following separately describes the operations 401 and 402.

401: The data processing apparatus extracts a feature value of each feature in a first feature set from the first network data in the first time period according to a feature extraction rule of the first data processing model.

In this embodiment of this application, the first feature set includes one or more features. For example, it is assumed that first network data is network data generated by a user, the first feature set includes a feature 1, a feature 2, and a feature 3. A feature value of the feature 1 indicates a current login address of the user, a feature value of the feature 2 indicates a current login time of the user, and a feature value of the feature 3 indicates an Internet protocol (IP) address currently used by the user.

In an embodiment, in this embodiment of this application, the data processing apparatus pre-stores a feature extraction rule and a feature set corresponding to each data processing model in the data processing model set. A feature set corresponding to the first data processing model is referred to as the first feature set, and a feature set corresponding to the second data processing model is referred to as a second feature set. In an embodiment, a feature extraction rule of the first data processing model is different from that of the second data processing model, and the first feature set is different from the second feature set. In an embodiment, a quantity of features in the first feature set is different from that in the second feature set. For example, the second feature set includes the feature 1 and the feature 2.

402: The data processing apparatus inputs the feature value extracted from the first network data into the first data processing model in the first time period, to process the first network data by using the first data processing model.

Refer to FIG. 2B, in an embodiment, the data processing apparatus performs operation 401 by using the feature extraction module, and the data processing apparatus performs operation 402 by using the data processing module.

For example, it is assumed that the first network data is network data generated by a user, and the feature value extracted from the first network data indicates a current login address of the user, a current login time of the user, and an IP address currently used by the user. A result of processing the first network data by the first data processing model indicates that the current login of the user is normal or abnormal.

In the operations 401 and 402, the data processing apparatus may extract the feature value in the network data according to the feature extraction rule of the data processing model and the feature in the feature set. In this way, the data processing model set may include data processing models having different feature extraction rules and feature sets. This can add more data processing models to the data processing model set, and select an optimal data processing model for processing the first network data.

Refer to FIG. 3. In the operation 302, the data processing apparatus selects the first data processing model from the data processing model set based on the first prediction information, where the first prediction information includes a predicted value of a data amount to be processed in a first time period. The following describes a possible specific implementation of the operation 302.

Figure 5:
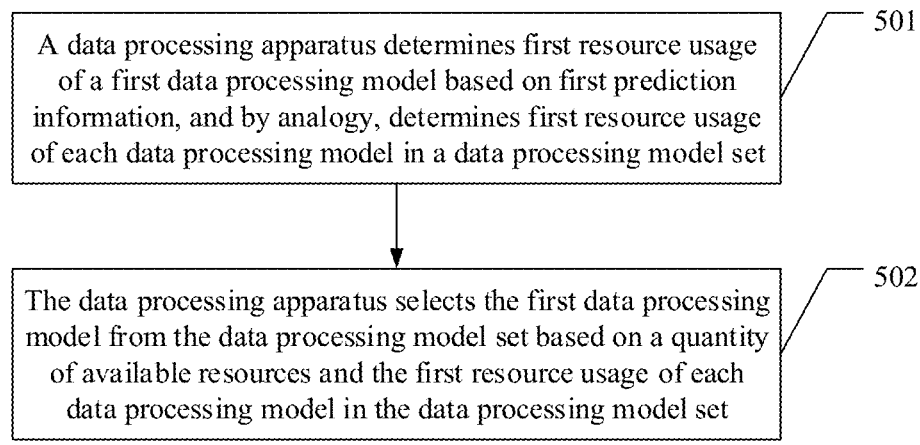
FIG. 5 is a schematic diagram of another embodiment of a data processing method according to an embodiment of this application.

Refer to FIG. 5, in an embodiment, the operation 302 includes operations 501 and 502.

501: The data processing apparatus determines first resource usage of the first data processing model based on the first prediction information, and by analogy, determines first resource usage of each data processing model in the data processing model set.

In this embodiment of this application, the first resource usage of the first data processing model is a predicted value of a first quantity of resources used when the data processing apparatus executes a first process by using the first data processing model. In an embodiment, the first quantity of resources is available duration in the first time period.

502: The data processing apparatus selects the first data processing model from the data processing model set based on a quantity of available resources and the first resource usage of each data processing model in the data processing model set.

The quantity of available resources is a first quantity of available resources in the first time period. In this embodiment of this application, the first quantity of available resources of the data processing apparatus in different time periods is the same. In an embodiment, the first quantity of available resources of the data processing apparatus in different time periods is different. In an embodiment, the first quantity of available resources is a predicted value of the first quantity of available resources in the first time period.

The following analyzes advantageous effects of the operations 501 and 502.

It is assumed that the resource usage corresponding to the first data processing model is less than resource usage corresponding to the second data processing model, the throughput of the first data processing model is greater than that of the second data processing model, and the accuracy of the first data processing model is less than that of the second data processing model. It is assumed that the resource usage corresponding to the first data processing model does not exceed the first quantity of available resources in the first time period, a data amount processed by the data processing model in a single time period by using the first data processing model does not exceed the throughput of the first data processing model. The resource usage corresponding to the data processing model refers to the first resource usage when the data processing apparatus processes the data amount in the single time period by using the data processing model. Based on the preceding analysis, the resource usage corresponding to the data processing model may reflect the throughput and the accuracy of the data processing model.

From the foregoing conclusions, in the operations 501 and 502, basis for selecting the first data processing model by the data processing apparatus includes the first prediction information, the quantity of available resources, and accuracy and a throughput of each data processing model in the data processing model set. In this way, the data processing apparatus may select the optimal data processing model for processing the first network data. This can improve performance of processing the first network data.

A partial quantity of resources of the data processing model affects the throughput of the data processing model. To ensure that the data processing apparatus can select the optimal data processing model, this embodiment of this application further relates to the partial quantity of resources. For ease of description, the quantity of resources affecting the throughput of the data processing model is referred to as a second quantity of resources. The second quantity of resources includes, for example, at least one of a quantity of hardware resources and a quantity of network resources. The quantity of hardware resources includes, for example, a CPU resource, a memory resource, and a network resource, for example, network bandwidth.

The following example first describes a relationship between the throughput of the data processing model and the second quantity of available resources.

It is assumed that T1 and T2 are two different time periods, and a second quantity of available resources of the data processing apparatus in T1 is greater than that of the data processing apparatus in T2. For a same data processing model (for example, the first data processing model) in the data processing model set, a throughput of the first data processing model in T1 is higher than that of the first data processing model in T2. For the first data processing model and the second data processing model, it is assumed that the throughput of the first data processing model is lower than that of the second data processing model in T1, the throughput of the first data processing model is still lower than that of the second data processing model in T2.

In an embodiment, based on the foregoing analysis on the relationship between the throughput of the data processing model and the second quantity of available resources, to further improve the performance of processing the first network data by the data processing apparatus, the first prediction information further includes a second quantity of available resources in the first time period. Refer to FIG. 3. In the operation 301, the data processing apparatus obtains the predicted value of the data amount to be processed in the first time period and the second quantity of available resources. Refer to FIG. 3. In the operation 302, the data processing apparatus selects the first data processing model from the data processing model set based on the predicted value of the data amount to be processed in the first time period and the second quantity of available resources. Refer to FIG. 5. In the operation 501, the data processing apparatus determines the first resource usage of the first data processing model based on the predicted value of the data amount to be processed in the first time period and the second quantity of available resources in the first time period.

In an embodiment, if the second quantity of available resources of the data processing apparatus in different time periods is different, the second quantity of available resources obtained by the data processing apparatus in the first time period is a predicted value of the second quantity of available resources in the first time period. For example, with reference to the functional block diagram in FIG. 2B, the predicted value of the second quantity of available resources in the first time period is generated by a resource prediction module.

The above describes the operations 501 and 502 with reference to FIG. 5. The following describes possible implementations of the operations 501 and 502 respectively.

A first implementation of the operation 501 is first described. In this embodiment of this application, the operation 501 includes operation 5011*a*.

5011*a*: The data processing apparatus inputs the first prediction information into a prediction model to obtain the first resource usage of the first data processing model.

In this embodiment of this application, the prediction model is used to predict a first quantity of resources used when the data processing apparatus executes a single process by using the first data processing model. The single process is a process of processing a data amount to be processed in one time period.

The prediction model is obtained by training based on a historical sample set, and the historical sample set includes a plurality of samples with a label. The following uses a first sample in the historical sample set as an example to describe a sample in the historical sample set. The first sample includes an actual value of a data amount to be processed in a second time period. A label of the first sample is an actual value of a first quantity of resources used when the data processing apparatus executes a second process based on the first data processing model. The second process is a process of processing a data amount to be processed in the second time period. The second time period is earlier than the first time period. In an embodiment, the second time period is a time period earlier than the first time period, or there is at least one time period between the second time period and the first time period.

In this embodiment of this application, the data processing apparatus sets different prediction models for the first data processing model and the second data processing model. For ease of distinguishing, the prediction model corresponding to the first data processing model is referred to as a first prediction model, and the prediction model corresponding to the second data processing model is referred to as a second prediction model. The data processing apparatus inputs the first prediction information into the first prediction model to obtain the first resource usage of the first data processing model. The data processing apparatus inputs the first prediction information into the second prediction model to obtain the first resource usage of the second data processing model.

Alternatively, the data processing model sets a same prediction model for the first data processing model and the second data processing model. The data processing apparatus inputs the first prediction information into the prediction model to obtain the first resource usage of the first data processing model and the first resource usage of the second data processing model.

In the operation 5011*a*, the data processing apparatus determines the first resource usage of the first data processing model by training based on the machine learning method. This can improve the accuracy of the first resource usage, select the optimal data processing model, and improve the performance of processing the first network data.

Refer to FIG. 3, FIG. 5, and the operation 5011*a*. In an embodiment, if the data processing apparatus performs the operation 302 in FIG. 3 according to the operations 5011*a* and 502, after the operation 304, the data processing method in this embodiment of this application further includes operations 305 and 306.

305: The data processing apparatus obtains first actual information and second resource usage.

In this embodiment of this application, the first actual information includes an actual value of a processed data amount in the first time period. The second resource usage is an actual value of the first quantity of resources used when the data processing apparatus executes the first process by using the first data processing model.

In this embodiment of this application, the data processing apparatus uses the first actual information as a sample for training the prediction model, and uses the second resource usage as a label of the sample.

306: The data processing apparatus trains the prediction model based on the first actual information and the second resource usage.

In this embodiment of this application, after obtaining the first actual information and the second resource usage, the data processing apparatus trains the prediction model based on the first actual information and the second resource usage. Alternatively, the data processing apparatus stores the obtained first actual information and the obtained second resource usage, and trains the prediction model by using the stored sample when a preset condition is met. For ease of understanding, the following describes the preset condition.

In this embodiment of this application, when a quantity of samples stored by the data processing apparatus reaches a preset quantity, the data processing apparatus determines that the preset condition is met. Alternatively, when accuracy of the prediction model is lower than preset accuracy, the data processing apparatus determines that the preset condition is met. Alternatively, the data processing apparatus trains the prediction model by using the stored sample at a fixed interval.

In the operations 305 and 306, the data processing apparatus can continuously add or update the historical sample set of the prediction model to improve a prediction effect of the prediction model, so that a prediction result of the prediction model is further close to an actual result. The data processing apparatus may select the first data processing model from the data processing model set based on the quantity of available resources and the prediction result of the prediction model. This can select the optimal data processing model, and improve the performance of processing the first network data.

The following describes a second implementation of the operation 501. In this embodiment of this application, the operation 501 includes operation 5011*b*.

5011*b*: The data processing apparatus determines the first resource usage of the first data processing model based on the first prediction information, second actual information, a third resource usage, a performance parameter of the first data processing model, and a performance parameter of a used data processing model.

In this embodiment of this application, the data processing apparatus processes, in a third time period, a data amount to be processed in the third time period by using the used data processing model. The third time period is earlier than the first time period. The used data processing model is the first data processing model or the second data processing model, or the used data processing model is a data processing model other than the first data processing model and the second data processing model in the data processing model set.

The second actual information includes an actual value of a processed data amount in the third time period. The third resource usage is an actual value of a first quantity of resources used when the data processing apparatus executes a third process by using the used data processing model. In an embodiment, to ensure that the data processing apparatus can more accurately select the optimal data processing model, the second actual information further includes a second quantity of available resources in the third time period.

The performance parameter of the first data processing model specifies the accuracy of the first data processing module, and is different from that of the second data processing module.

Refer to FIG. 4 and related descriptions thereof. In this embodiment of this application, the performance parameter of the first data processing model is the quantity of features in the first feature set, and the performance parameter of the second data processing model is the quantity of features in the second feature set. The quantity of features in the first feature set is different from that in the second feature set.

In the operation 5011*b*, the data processing apparatus may determine the first quantity of resources of the first data processing model without depending on the prediction model. In this way, the data processing apparatus can reduce a resource required for training the prediction model.

For ease of understanding, the following describes a specific implementation of the operation 5011*b*.

Ta represents the third time period (for example, a last time period in the past), and Tb represents the first time period (for example, a first time period in the future). It is assumed that the first prediction information includes a predicted value (represented by d1) of a data amount to be processed in Tb and a predicted value (represented by r1) of a second quantity of available resources in Tb. The second actual information includes an actual value (represented by d0) of a data amount processed in Ta and an actual value (represented by r0) of the second quantity of available resources in Ta. It is assumed that the first quantity of resources is a time length consumed when the data processing apparatus processes the received network data and the used data processing model is the second data processing model. The first resource usage of the first data processing model $t1=t0+t0*(\varepsilon*(s1/s2)*(d1/d0)*(r0/r1)-1)$. t0 represents the third resource usage, s1 represents a quantity of first input features, s2 represents a quantity of second input features, and $\varepsilon$ is a constant coefficient.

The foregoing separately describes two implementations of the operation 501 in the operations 5011*a* and 5011*b*. In this embodiment of this application, the data processing apparatus performs the operation 501 according to the operation 5011*a* under a first condition, and the data processing apparatus performs the operation 501 according to the operation 5011*b* under a second condition.

For example, the data processing apparatus performs the operation 501 according to the operation 5011*b* in a training process or an optimization process of the prediction model, and the data processing apparatus performs the operation 501 according to the operation 5011*a* when the prediction model is trained or optimized. The data processing apparatus may perform the method in this embodiment of this application in a plurality of adjacent time periods. This can maintain high performance of the data processing apparatus in the network data processing process.

The above describes the implementation of the operation 501 shown in FIG. 5. The following describes an implementation of the operation 502 shown in FIG. 5. In the operation 502, the data processing apparatus selects the first data processing model from the data processing model set based on a quantity of available resources and the first resource usage of each data processing model in the data processing model set. The operation 502 may be implemented in a plurality of manners. The following describes the implementations of the operation 502 in two cases.

Case 1: To meet a throughput requirement, the first resource usage of the first data processing model does not exceed the quantity of available resources.

For ease of description, the data processing model that is selected from the data processing model set and whose first resource usage does not exceed the quantity of available resources is referred to as a candidate data processing model. It is assumed that the data processing model set includes a plurality of candidate data processing models. In an embodiment, the plurality of candidate data processing models, the first data resource of the first data processing model is largest. In other words, in the plurality of candidate data processing models, a difference between the first resource usage and the quantity of available resources of the first data processing model is smallest. This can improve accuracy of the selected data processing model when the throughput requirement is met, to improve the performance of processing the first network data by the data processing apparatus.

Case 2: there may be an error in a process of determining the first resource usage. In this embodiment of this application, the first resource usage of the first data processing model is not limited to be less than or equal to the quantity of available resources.

In an embodiment, the data processing apparatus selects the first data processing model based on a first difference and a second difference. The first difference is a difference between the first resource usage and the quantity of available resources of the first data processing model, and the second difference is a difference between the first resource usage and the quantity of available resources of the second data processing model.

In case 2, the operation 502 may be implemented in different specific manners. For example, because the first difference is less than the second difference, the data processing apparatus selects the first data processing model. Alternatively, the data processing apparatus selects the first data processing model based on a probability of selecting a data processing model in the data processing model set. Specifically, the data processing apparatus determines a probability of selecting the first data processing model based on the first difference, and by analogy, determines a probability of selecting each data processing model in the data processing model set. Then, the data processing apparatus selects the first data processing model from the data processing model set based on the probability of selecting each data processing model in the data processing model set. If the first difference is greater than the second difference, the probability of selecting the first data processing model is greater than that of the second data processing model. If the first difference is less than the second difference, the probability of selecting the first data processing model is lower than that of the second data processing model.

The machine learning method in any embodiment of the data processing method in this application may include but is not limited to any one of the following methods: a gradient boosting decision tree (GBDT), logistic regression, a recurrent neural network (RNN), and a long short-term memory (LSTM) network.

The above describes a plurality of embodiments of the data processing method in this application. With reference to the data processing apparatus shown in FIG. 2A, in an embodiment, the processor 201 performs the foregoing method embodiment based on the program instructions stored in the memory 202. For example, the processor 201 performs, based on the program instructions stored in the memory 202, the operations 301 to 306 in the embodiment shown in FIG. 3, the operations 401 and 402 in the embodiment shown in FIG. 4, the operations 501 and 502 in the embodiment shown in FIG. 5, the operation 5011a, or the operation 5011b. For more details of implementing the foregoing operations by the processor 201, refer to the description in the foregoing method embodiments. Details are not described herein again.

Figure 6:
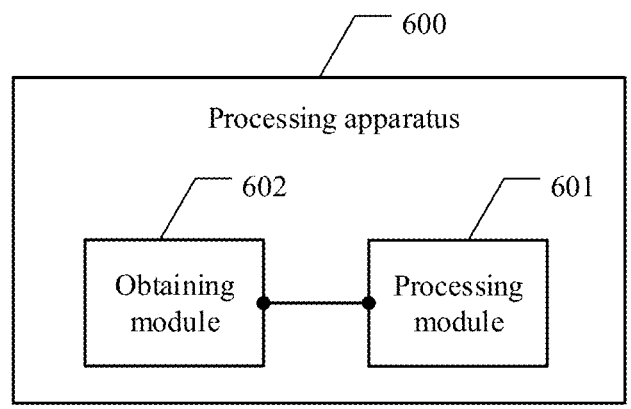
FIG. 6 is a schematic diagram of a structure of a processing apparatus according to an embodiment of this application.

Correspondingly, an embodiment of this application further provides a processing apparatus. FIG. 6 is a schematic diagram of a structure of a processing apparatus according to an embodiment of this application. The processing apparatus 600 is coupled to the data processing apparatus in the foregoing method embodiments, for example, integrated into the data processing apparatus, and is a software or hardware component in the data processing apparatus.

Refer to FIG. 6. The processing apparatus 600 includes a processing module 601 and an obtaining module 602. The processing module 601 is configured to perform the operations 301, 302, and 304 in the embodiment shown in FIG. 3, or perform the operations 301, 302, 304, 305, and 306 in the embodiment shown in FIG. 3, or perform the operations 401 and 402 in the embodiment shown in FIG. 4, or perform the operations 501 and 502 in the embodiment shown in FIG. 5, or perform the operation 5011a or 5011b of the foregoing operations. The obtaining module 602 is configured to perform the operation 303 in the embodiment shown in FIG. 3. For specific performing processes of the processing module 601 and the obtaining module 602, refer to the detailed descriptions of corresponding operations in embodiments shown in the foregoing corresponding accompanying drawings. Details are not described herein again.

The apparatus embodiment in FIG. 6 is merely an example. For example, division into the modules is merely logical function division. The module may be divided in other division manners during actual implementation. For example, a plurality of modules or components may be combined or integrated into another system, or some feature may be ignored or not performed. The functional modules in embodiments of this application may be integrated into one processing module, or each of the modules may exist alone physically, or two or more modules may be integrated into one module. The foregoing modules in FIG. 6 may be implemented in a form of hardware, or may be implemented in a form of a software function unit. For example, when the module is implemented in a form of software, the processing module 601 and the obtaining module 602 may be implemented by the software functional module generated after the processor 201 in FIG. 2A reads program code stored in the memory 202. The module in FIG. 6 may separately be implemented by different hardware in the data processing apparatus. For example, the obtaining module 602 is implemented by the network interface 203 in FIG. 2A, and the processing module 601 is implemented by using some processing resources (for example, another core in a multi-core CPU) in the processor 201 in FIG. 2A, or by using a programmable component, for example, a field-programmable gate array (FPGA) or a coprocessor. It is clearly that the foregoing functional module may also be implemented in a combination of software and hardware. For example, the obtaining module 602 is implemented by the network interface 203, and the processing module 601 is implemented by the software functional module generated after the processor 201 reads program instructions stored in the memory 202.

For technical effects that can be implemented by the processing apparatus shown in FIG. 6, and functions that can be realized by the processing module 601 and the obtaining module 602, refer to the description of the data processing apparatus in the foregoing method embodiments. Details are not described herein again.

Embodiments in this specification are all described in a progressive manner. For same or similar parts in embodiments, refer to these embodiments. Each embodiment focuses on a difference from other embodiments. Especially, a system embodiment is basically similar to a method embodiment, and therefore is described briefly. For related parts, refer to partial descriptions in the method embodiment.

A person skilled in the art can understand that, when the aspects of embodiments of this application or the implementations of each aspect are implemented in a form of software, the foregoing aspects or the implementations of each aspect may be all or partially implemented in a form of a computer program product. The computer program product refers to computer readable instructions stored in a computer-readable medium. When the computer instructions are loaded and executed on a computer, the procedures or functions according to embodiments of this application are all or partially generated.

The computer-readable medium may be a computer-readable signal medium or a computer-readable storage medium. The computer readable storage medium includes but is not limited to an electronic, magnetic, optical, electromagnetic, infrared, or semiconductor system, device, or apparatus, or any appropriate combination thereof. For example, the computer-readable storage medium is a random access memory (RAM), a read-only memory (ROM), an erasable programmable read-only memory (EPROM), or a compact disc read-only memory (CD-ROM).

Obviously, a person skilled in the art can make various modifications and variations to the present invention without departing from the scope of the present invention. The present invention is intended to cover these modifications and variations provided that the modifications and variations in this application fall within the scope of the claims of the present invention.

What is claimed is:

1. A data processing method, comprising:
obtaining, by a data processing apparatus, first prediction information, wherein the first prediction information comprises a predicted value of a data amount to be processed in a first time period, and the first time period starts from a first moment, wherein the data processing apparatus in a preset network environment and configured to process collected network data in a preset network environment;
selecting, by the data processing apparatus, a first data processing model from a data processing model set based on the first prediction information, wherein the data processing model set comprises a second data processing model and the first data processing model, wherein accuracy of the first data processing model is higher than that of the second data processing model, and a throughput of the first data processing model is lower than that of the second data processing model; or wherein accuracy of the first data processing model is lower than that of the second data processing model, and a throughput of the first data processing model is higher than that of the second data processing model;
receiving, by the data processing apparatus, collected first network data when the first moment arrives; and
processing, by the data processing apparatus, the first network data in the first time period by using the first data processing model.

2. The method according to claim 1, wherein the selecting the first data processing model from a data processing model set based on the first prediction information comprises:
determining, by the data processing apparatus, first resource usage of the first data processing model based on the first prediction information, and by analogy, determining first resource usage of each data processing model in the data processing model set, wherein the first resource usage of the first data processing model is a predicted value of a first quantity of resources used when the data processing apparatus executes a first process by using the first data processing model, and the first process is a process of processing the data amount to be processed in the first time period; and
selecting, by the data processing apparatus, the first data processing model from the data processing model set based on a quantity of available resources and the first resource usage of each data processing model in the data processing model set, wherein the quantity of available resources is a first quantity of available resources in the first time period.

3. The method according to claim 2, wherein the determining the first resource usage of the first data processing model based on the first prediction information comprises:
inputting, by the data processing apparatus, the first prediction information into a prediction model to obtain the first resource usage of the first data processing model, wherein the prediction model is used to predict a first quantity of resources used when the data processing apparatus executes a single process by using the first data processing model;
wherein the single process processes a data amount to be processed in one time period, and the prediction model is obtained by training based on a historical sample set;
wherein the historical sample set comprises a first sample;
wherein the first sample comprises an actual value of a data amount to be processed in a second time period;
wherein a label of the first sample is an actual value of a first quantity of resources used when the data processing apparatus executes a second process based on the first data processing model; and
wherein the second process processing a data amount to be processed in the second time period; and the second time period is earlier than the first time period.

4. The method according to claim 3, wherein after the processing the first network data in the first time period by using the first data processing model, the method further comprises:
obtaining, by the data processing apparatus, first actual information and second resource usage, wherein the first actual information comprises an actual value of a processed data amount in the first time period, and the second resource usage is an actual value of the first quantity of resources used when the data processing apparatus executes the first process by using the first data processing model; and
training, by the data processing apparatus, the prediction model based on the first actual information and the second resource usage.

5. The method according to claim 2, wherein the determining the first resource usage of the first data processing model based on the first prediction information comprises:
determining, by the data processing apparatus, the first resource usage of the first data processing model based on the first prediction information, second actual information, a third resource usage, a performance parameter of the first data processing model, and a performance parameter of a used data processing model, wherein the used data processing model is one of the first data processing model, or the second data processing model, or a third data processing model in the data processing model set;
wherein the second actual information comprises an actual value of a processed data amount in a third time period;
wherein the third resource usage is an actual value of a first quantity of resources used when the data processing apparatus executes a third process by using the used data processing model;
wherein the third process processes a data amount to be processed in the third time period, which is earlier than the first time period;
wherein the performance parameter of the first data processing model indicates the accuracy of the first data processing model; and
wherein the performance parameter of the first data processing model is different from that of the second data processing model.

6. The method according to claim 5, wherein the processing the first network data in the first time period by using the first data processing model comprises:
extracting, by the data processing apparatus, a feature value of each feature in a first feature set from the first network data in the first time period according to a feature extraction rule of the first data processing model, wherein a quantity of features in a second feature set is different from that of features in the first feature set; the first feature set and the second feature set respectively correspond to the first data processing model and the second data processing model; and inputting, by the data processing apparatus, the feature value extracted from the first network data into the first data processing model in the first time period, to process the first network data by using the first data processing model.

7. The method according to claim 6, wherein the performance parameter of the first data processing model is the quantity of features in the first feature set.

8. The method according to claim 2, wherein a difference between the first resource usage and the quantity of available resources of the first data processing model is less than a difference between the first resource usage and the quantity of available resources of the second data processing model.

9. The method according to claim 2, wherein the first quantity of resources is a time length consumed when the data processing apparatus processes the received network data.

10. The method according to claim 1, wherein the preset network environment comprises a network data sending apparatus and the data processing apparatus;
wherein the sending apparatus comprises one or more data source devices, or the sending apparatus is a packet forwarding device with a data collection function;
wherein the collected network data comprises network data that is generated by the one or more data source devices, collected by the packet forwarding device;
wherein the data processing apparatus is a computer, a computer cluster, or a computer in the computer cluster; and
wherein the computer cluster is configured to process the collected network data in a load balancing manner.

11. The method according of claim 1, wherein the first prediction information further comprises a predicted value of a second quantity of resources in the first time period.

12. The method according to claim 11, wherein the second quantity of resources comprises at least one of a quantity of hardware resources and a quantity of network resources.

13. A data processing apparatus, configured to process collected network data in a preset network environment, comprising:
a network interface;
a processor; and
a memory connected to the processor and configured to store instructions, which, when executed by the processor, cause the data processing apparatus to perform operations comprising:
obtaining first prediction information, wherein the first prediction information comprises a predicted value of a data amount to be processed in a first time period, and the first time period starts from a first moment;
selecting a first data processing model from a data processing model set based on the first prediction information, wherein the data processing model set comprises a second data processing model and the first data processing model, accuracy of the first data processing model is higher than that of the second data processing model, and a throughput of the first data processing model is lower than that of the second data processing model; or accuracy of the first data processing model is lower than that of the second data processing model, and a throughput of the first data processing model is higher than that of the second data processing model;
receiving collected first network data when the first moment arrives; and
processing the first network data in the first time period by using the first data processing model.

14. The apparatus according to claim 13, wherein the operations further comprise:
determining first resource usage of the first data processing model based on the first prediction information, and by analogy, determine first resource usage of each data processing model in the data processing model set, wherein the first resource usage of the first data processing model is a predicted value of a first quantity of resources used when the data processing apparatus executes a first process by using the first data processing model, and the first process is a process of processing the data amount to be processed in the first time period; and
selecting the first data processing model from the data processing model set based on a quantity of available resources and the first resource usage of each data processing model in the data processing model set, wherein the quantity of available resources is a first quantity of available resources in the first time period.

15. The apparatus according to claim 14, wherein the operations further comprise:
inputting the first prediction information into a prediction model to obtain the first resource usage of the first data processing model, wherein the prediction model is used to predict a first quantity of resources used when the data processing apparatus executes a single process by using the first data processing model;
wherein the single process is a process of processing a data amount to be processed in one time period, and the prediction model is obtained by training based on a historical sample set;
wherein the historical sample set comprises a first sample;
wherein the first sample comprises an actual value of a data amount to be processed in a second time period;
wherein a label of the first sample is an actual value of a first quantity of resources used when the data processing apparatus executes a second process based on the first data processing model;
wherein the second process is a process of processing a data amount to be processed in the second time period; and
wherein the second time period is earlier than the first time period.

16. The apparatus according to claim 15, wherein the operations further comprise:
obtaining first actual information and second resource usage after processing the first network data in the first time period by using the first data processing model, wherein the first actual information comprises an actual value of a processed data amount in the first time period, and the second resource usage is an actual value of the first quantity of resources used when the data processing apparatus executes the first process by using the first data processing model; and
training the prediction model based on the first actual information and the second resource usage.

17. The apparatus according to claim 14, wherein the operations further comprise:
determining the first resource usage of the first data processing model based on the first prediction information, second actual information, a third resource usage, a performance parameter of the first data processing model, and a performance parameter of a used data processing model, wherein the used data processing model is one of the first data processing model, the second data processing model, or a third data processing model in the data processing model set;

wherein the second actual information comprises an actual value of a processed data amount in a third time period;

wherein the third resource usage is an actual value of a first quantity of resources used when the data processing apparatus executes a third process by using the used data processing model;

wherein the third process processes a data amount to be processed in the third time period, and the third time period is earlier than the first time period; and wherein the performance parameter of the first data processing model indicates the accuracy of the first data processing model, and the performance parameter of the first data processing model is different from that of the second data processing model.

18. The apparatus according to claim 17, wherein the operations further comprise:

extracting a feature value of each feature in a first feature set from the first network data in the first time period according to a feature extraction rule of the first data processing model, wherein a quantity of features in the first feature set is different from that of features in a second feature set, wherein the first feature set and the second feature set respectively correspond to the first data processing model and the second data processing model; and inputting the feature value extracted from the first network data into the first data processing model in the first time period, to process the first network data by using the first data processing model.

19. The apparatus according to claim 18, wherein the performance parameter of the first data processing model is the quantity of features in the first feature set.

20. A non-transitory computer-readable medium storing program instructions, which when executed by a processor of a data processing apparatus, cause the data processing apparatus to perform operations comprising:

obtaining first prediction information, wherein the first prediction information comprises a predicted value of a data amount to be processed in a first time period, and the first time period starts from a first moment;

selecting a first data processing model from a data processing model set based on the first prediction information, wherein the data processing model set comprises a second data processing model and the first data processing model, accuracy of the first data processing model is higher than that of the second data processing model, and a throughput of the first data processing model is lower than that of the second data processing model; or accuracy of the first data processing model is lower than that of the second data processing model, and a throughput of the first data processing model is higher than that of the second data processing model;

receiving collected first network data when the first moment arrives; and processing the first network data in the first time period by using the first data processing model.

* * * * *